(12) United States Patent
Friesen et al.

(10) Patent No.: US 11,392,524 B2
(45) Date of Patent: Jul. 19, 2022

(54) INTERFACE MODULE, SYSTEM HAVING AN INTERFACE MODULE AND METHOD FOR COUPLING DATA BUSES

(71) Applicant: HARTING Electric GmbH & Co. KG, Espelkamp (DE)

(72) Inventors: Markus Friesen, Espelkamp (DE); Lutz Tröger, Osnabrück (DE)

(73) Assignee: Harting Electric GmbH & Co. KG, Espelkamp, WA (US)

( * ) Notice: Subject to any disclaimer, the term of this patent is extended or adjusted under 35 U.S.C. 154(b) by 145 days.

(21) Appl. No.: 16/305,375

(22) PCT Filed: Jun. 8, 2017

(86) PCT No.: PCT/DE2017/100485
§ 371 (c)(1),
(2) Date: Nov. 28, 2018

(87) PCT Pub. No.: WO2017/220074
PCT Pub. Date: Dec. 28, 2017

(65) Prior Publication Data
US 2020/0327081 A1    Oct. 15, 2020

(30) Foreign Application Priority Data
Jun. 24, 2016   (DE) .................... 10 2016 111 672.6

(51) Int. Cl.
*G06F 13/40* (2006.01)
*G06F 13/42* (2006.01)
*H04W 4/80* (2018.01)

(52) U.S. Cl.
CPC ...... *G06F 13/4004* (2013.01); *G06F 13/4282* (2013.01); *H04W 4/80* (2018.02)

(58) Field of Classification Search
CPC ............. G06F 13/4004; G06F 13/4282; H04L 12/40091; H04L 12/40
See application file for complete search history.

(56) References Cited

U.S. PATENT DOCUMENTS

| | | | |
|---|---|---|---|
| 5,457,784 A | * | 10/1995 | Wells .................... G06F 13/385 703/24 |
| 6,220,870 B1 | * | 4/2001 | Barabi ............... H01R 13/2485 439/71 |

(Continued)

FOREIGN PATENT DOCUMENTS

| | | |
|---|---|---|
| DE | 20 2004 016 591 U1 | 3/2006 |
| DE | 10 2012 202 160 A1 | 8/2013 |

(Continued)

OTHER PUBLICATIONS

German Office Action, dated Feb. 14, 2017, for German Application No. 10 2016 111 672.6, 9 pages.

(Continued)

*Primary Examiner* — Phong H Dang
(74) *Attorney, Agent, or Firm* — Seed IP Law Group LLP

(57) ABSTRACT

An interface module for coupling data buses to first signal line ports, to which signal lines of at least one first data bus are connectable, and second signal line ports, to which signal lines of at least one second data bus are connectable, has at least one connecting device for making at least one connection between one of the first signal line ports and one of the second signal line ports. In this case, the first signal line port connected to the second signal line port is alternately connectable to at least one other second signal line port and/or the second signal line port connected to the first signal line port is alternately connectable to at least one other first signal line port. A related system has at least one such interface module and at least one apparatus that has the at (Continued)

least one first data bus and/or at the least one second data bus.

10 Claims, 2 Drawing Sheets

(56) References Cited

U.S. PATENT DOCUMENTS

| | | | |
|---|---|---|---|
| 7,401,162 B2* | 7/2008 | Baker | H04L 69/18 709/250 |
| 2005/0065647 A1 | 3/2005 | Perry et al. | |
| 2006/0041328 A1 | 2/2006 | McCormick | |
| 2006/0136651 A1* | 6/2006 | Yap | G06F 13/4063 710/316 |
| 2006/0190094 A1 | 8/2006 | Gehlen et al. | |
| 2006/0244565 A1 | 11/2006 | Friedrich et al. | |
| 2007/0124001 A1 | 5/2007 | Opaterny | |
| 2009/0265492 A1 | 10/2009 | Hoffmann | |
| 2011/0294359 A1* | 12/2011 | Cho | H01R 27/00 439/676 |
| 2015/0156089 A1* | 6/2015 | McCleland | H04L 43/08 307/1 |
| 2015/0158440 A1 | 6/2015 | Maier | |
| 2017/0017595 A1* | 1/2017 | Schnell | G06F 13/4022 |

FOREIGN PATENT DOCUMENTS

| | | |
|---|---|---|
| EP | 1 500 994 A1 | 1/2005 |
| EP | 1 647 869 A2 | 4/2006 |
| EP | 1 791 048 A1 | 5/2007 |
| EP | 2 110 995 A1 | 10/2009 |
| WO | 2013/159985 A1 | 10/2013 |

OTHER PUBLICATIONS

International Search Report and Written Opinion, dated Sep. 11, 2017, for International Application No. PCT/DE2017/100485, 15 pages. (with English Translation of Search Report).
International Preliminary Report on Patentability, dated Dec. 25, 2018, for International Application No. PCT/DE2017/100485, 8 pages.

* cited by examiner

INTERFACE MODULE, SYSTEM HAVING AN INTERFACE MODULE AND METHOD FOR COUPLING DATA BUSES

BACKGROUND

Technical Field

The present disclosure relates to an interface module for coupling data buses to first signal line ports to which signal lines of at least a first data bus are connectable, and to second signal line ports to which signal lines of at least a second data bus are connectable, said interface module comprising at least one connecting means or device for establishing at least one connection between one of the first signal line ports and one of the second signal line ports. Furthermore, the present disclosure relates to a system having at least one such interface module and at least one device which comprises at least the first data bus and/or at least the second data bus. Finally, the present disclosure relates to a method for coupling data buses via an interface module, in which signal lines of at least a first data bus are connected to first signal line ports of the interface module and signal lines of at least a second data bus are connected to second signal line ports of the interface module, and at least one connection is established between one of the first signal line ports and one of the second signal line ports.

Description of the Related Art

Many devices and pieces of equipment are provided with interchangeable modules for reasons of flexibility. For example, many robot arms can be equipped with various tool modules, thereby considerably increasing the possible practical applications of robots. In order for such functional modules to be able to be controlled by the device to which they are attached, a data bus of the module must be coupled to a data bus of the device. However, different modules generally comprise different data buses or bus systems, which may differ not only with respect to their data or signal transmission performance, but also with respect to the number and arrangement of their data or signal lines, terminals, or pins.

In order thus to configure a junction or a connecting point of a device for flexibly connecting as many functional modules as possible, if not all conceivable functional modules, on the one hand, it is known to have all conceivable interfaces individually available and to provide them adjacently in a connector profile, thus resulting in the provision of a correspondingly large number of terminals or pins in corresponding arrangements. Such an approach wastes space and is expensive and complex. On the other hand, for junctions or connecting points which are designed for only a single interface, corresponding adapters are known via which it is possible to couple different data buses to the relevant interface. However, this alternative has the aforementioned disadvantages, since, depending on the respective bus system for different data buses to be connected to the predetermined interface, a corresponding adapter must not only be provided but must also be as easily accessible as possible. Both approaches thus prove to be disadvantageous in particular if many different bus systems must be taken into account.

BRIEF SUMMARY

Embodiments of the present invention provide an interface module for coupling data buses, a system comprising such an interface module, and a method for coupling data buses, via which data buses of different bus systems can be coupled to one another in a space-saving, economical, and convenient manner.

According to embodiments of the present invention, an interface module or a system comprising an interface module is provided, in which the first signal line port connected to the second signal line port is alternately connectable to at least one other second signal line port, and/or in which the second signal line port connected to the first signal line port is alternately connectable to at least one other first signal line port. In the case of the method according to an embodiment of the present invention, a method is accordingly provided, in which a connection between one of the first signal line ports and one of the second signal line ports is changed, in that the first signal line port connected to the second signal line port is connected to another second signal line port, and/or in that the second signal line port connected to the first signal line port is connected to another first signal line port.

Although in the case of embodiments of the present invention, first and second signal line ports are respectively interconnected in pairs, a change in this connection is thus nonetheless possible in such a way that in the pair of interconnected signal line ports, the first signal line port is alternately replaced by another of the first signal line ports, and/or the second signal line port is alternately replaced by another of the second signal line ports. In other words, in the pair of interconnected signal line ports, another of the first signal line ports assumes the position of the first signal line port connected to the second signal line port, and is connected to this second signal line port after changing the connection, on the pair of interconnected signal line ports, another of the second signal line ports assumes the position of the second signal line port connected to the first signal line port, and is connected to this first signal line port after changing the connection, or another of the first signal line ports assumes the position of the first signal line port in the pair of interconnected signal line ports, and another of the second signal line ports assumes the position of the second signal line port in this pair, so that after changing the connection, these two other signal line ports are now interconnected, instead of the originally interconnected signal line ports. The connection is preferably an electrically conductive connection. In this way, a flexible interface module is implemented, of which the interface ports are freely adjustable or configurable. Via such an interface module, not only can first data buses be coupled to second data buses if both data buses respectively belong to different bus systems, but a data bus of a predetermined bus system can also be coupled to respective data buses of different bus systems without a plurality of connector profiles or adapters having to be provided for this purpose. The resulting saved space thus proves to be advantageous in particular for the miniaturization of interface modules. According to embodiments of the present invention, it is irrelevant whether respective signal lines of the same first data bus or different first data buses are connected or are connectable at first signal line ports which are connectable to the second signal line port. Correspondingly, respective signal lines of the same second data bus or different second data buses may be connected or may be connectable at second signal line ports which are connectable to the first signal line port.

To achieve this flexibility when connecting first and second signal line ports, for example, a multiplexer or a multiplex element may be provided for the connecting means or device, which is configured for connecting respective first and second signal line ports. Likewise, the connecting means or device may be configured as an integrated circuit or a so-called field-programmable gate array or FPGA, or the interface module or the connecting means or device may comprise an FPGA interface or a digital interface controlled by a microcontroller via software. Advantageously, an FPGA comprises multiplexer structures. The signal line ports may be any fixtures to which signal lines of data buses are connectable or which are electrically conductively connectable to signal lines of data buses. Such fixtures may, for example, be pins or sockets having contact elements.

Furthermore, according to embodiments of the present invention, it is irrelevant which bus system the first data bus or the first data buses and the second data bus or the second data buses belong to, or which bus system is their application type. Thus, the first or second data bus may be a system bus, a storage bus, a peripheral bus, an input/output bus, or a parallel or serial data bus. The type, or rather, the application type of the first and second signal lines may also be arbitrary. For example, it is irrelevant whether the first and second signal lines are a data line for transmitting data, or a clock line for transmitting clock signals. Preferably, via the interface module, first and second signal line ports are interconnected in pairs, to which respective signal lines of the first data bus and the second data bus of the same type are connected. This means that the signal lines of the first data bus and the second data bus, which are respectively connected to the first and second signal line ports which are interconnected, are both either data lines or clock lines.

In the simplest case, the interface module may be configured for a manual selection of the first and second signal line ports which are to be interconnected, or rather, the alternating connection of first signal line ports and second signal line ports may take place manually. Advantageously, in the case of the interface module, however, the alternating connection of first signal line ports and second signal line ports may be automatically controllable, and in a particularly advantageous method, the changing of the connection may take place automatically. Such an automatic alternating connection of signal line ports significantly simplifies the operation of the interface module or system, as well as the execution of the method according to embodiments of the present invention. Since manual selection of the first and second signal line ports to be connected and the manual establishment of the connection between them by an operator require a relatively large amount of time in practice, and are eliminated in the case of an automatically controlled connection of first and second signal line ports, in particular data buses of different bus systems can be coupled to one another significantly more rapidly by such interface modules.

Advantageously, the interface module may be designed to receive data relating to the alternating connection of first signal line ports and second signal line ports from an external data source. Correspondingly, in one particularly advantageous method, the interface module receives data, which relate to the changing of the connection, from an external data source. The external data source may be any device, for example, a simple data memory, a fixed or mobile computer, a mobile telephone, data glasses, or a drone. The interface module may either read out the data actively from a data source, or receive it passively from said data source. Particularly advantageously, however, the external data source is provided as part of a device comprising the first and/or the second data bus. Accordingly, a system is also contemplated in which the device is configured to transmit data to the interface module relating to the alternating connection of first signal line ports and second signal line ports. Thus, external measures for establishing the connection are no longer necessary if a device, of which the first or second data bus is connected or is to be connected to the first or second signal line ports, is replaced by another device, or if a first or second data bus of a device is to be connected for the first time to the first or second signal line ports of the interface module. Due to the fact that the interface module receives the data required for connecting signal lines of the first or second data bus of the relevant device to the first or second signal line ports, for example, the pin configuration which is required therefor, directly from the device itself, substantially full automation of the coupling process between the data buses to be coupled is ensured.

The interface module, according to one advantageous embodiment, comprises at least one control unit and/or at least one reading device for reading RFID (radio-frequency identification) transponders and/or at least one interface for data transmission, and/or it is possible to establish a data transmission connection at the interface module, to a device comprising the first data bus and/or the second data bus. Accordingly, in a particularly advantageous system, the device comprises at least one data memory or RFID transponder for storing data, and/or the system is configured for establishing a data transmission connection between the interface module and the device. In a particularly advantageous method, the interface module at least partially reads out the data from at least one data memory or RFID transponder of a device comprising at least one first data bus and/or at least one second data bus, and/or at least partially receives the same via at least one interface for data transmission, and/or the data is at least partially transmitted to the interface module from a device comprising at least the first and/or at least the second data bus, via a data transmission connection.

The control unit may, for example, be a microcontroller. Said control unit may in particular be provided for the automatic selection of first or second signal line ports.

The reading device may be any device for reading any RFID transponders which may be advantageously arranged at devices having first and/or second data buses and contain data about configurations of the first or second signal line ports or pin configurations needed by the first or second data bus of the device.

Likewise, the interface may be any interface for data transmission. For example, the control of the interface module may be possible from an external device, via the interface. Thus, the interface may be provided for serial or parallel data transmission to the interface module or from the interface module. The interface may be configured for connecting a cable or a glass fiber, or it may be an interface or radio interface for wireless communication or data transmission. Correspondingly, the data transmission connection which can be established via the device comprising the first or second data bus may be at least partially or completely wired, or it may be at least partially or completely established by way of a glass fiber, or it may be at least partially or completely wireless.

BRIEF DESCRIPTION OF THE SEVERAL VIEWS OF THE DRAWINGS

Embodiments of the present invention will be described in greater detail below with reference to drawings. The following are shown.

DETAILED DESCRIPTION

Figure 1:
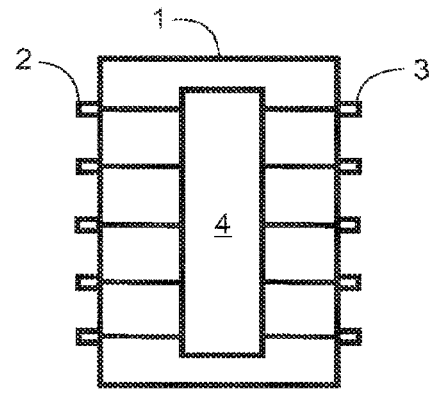
FIG. 1 shows a schematic representation of an interface module.

FIG. 1 shows an interface module 1 comprising first signal line ports or pins 2 which, in their entirety, form a first connector profile of the interface module 1. A plurality of second signal line ports or pins 3 which, in their entirety, form a second connector profile of the interface module 1. The first connector profile comprising the pins 2 and the second connector profile comprising the pins 3 are presently arranged on opposite sides of the interface module 1. Both the pins 2 of the first connector profile and the pins 3 of the second connector profile are connected to a connecting means or device of the interface module 1, which is a multiplexer 4 in the present case. By way of the multiplexer 4, each one of the pins 2 of the first connector profile is alternately connectable to each one of the pins 3 of the second connector profile. In other words, pins 2 of the first connector profile and pins 3 of the second connector profile are interconnectable in pairs, one of the pins 2 of the first connector profile being electrically connected to one of the pins 3 of the second connector profile. A plurality of such pairs formed from pins 2 of the first connector profile and pins 3 of the second connector profile may be formed, of which respective pins 2 and 3 are interconnected.

Although in the present case, the interface module 1 respectively comprises five first pins 2 and five second pins 3, the number of pins 2 and 3 is not limited to this number and may generally be arbitrary. In particular, the interface module 1 may also comprise only a single first signal line pin 2 or a single second signal line pin 3.

Figure 2:
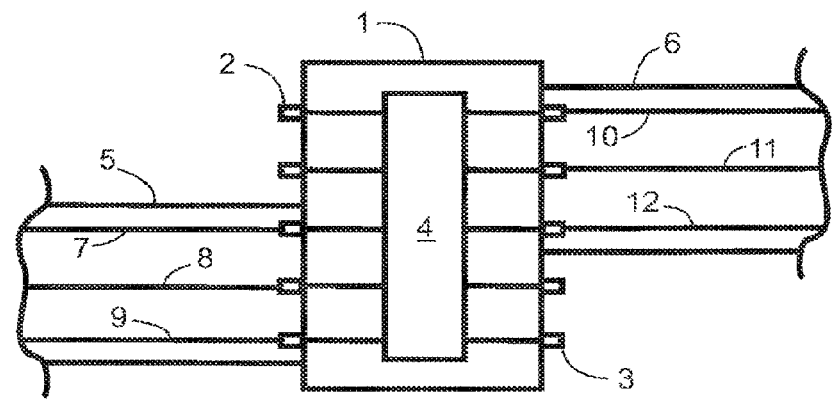
FIG. 2 shows the interface module of FIG. 1 comprising data buses which are connected to it.

Via the interface module 1, two or even a plurality of data buses may be coupled to one another if the data buses belong to different bus systems. For this purpose, FIG. 2 shows, by way of example, how the interface module 1 couples a first data bus 5 to a second data bus 6. The first data bus 5 comprises a first signal line 7, a second signal line 8, and a third signal line 9, of which each is connected to a respective one of the bottom three pins 2 in FIG. 2. On the other hand, the second data bus 6 comprises a first signal line 10, a second signal line 11, and a third signal line 12, of which each is connected to a respective one of the top three pins 3 in FIG. 2.

For coupling the first data bus 5 and the second data bus 6, the first signal line 7 of the first data bus 5 must be connected to the first signal line 10 of the second data bus 6, the second signal line 8 of the first data bus 5 must be connected to the second signal line 11 of the second data bus 6, and the third signal line 9 of the first data bus 5 must be connected to the third signal line 12 of the second data bus 6. For this reason, the multiplexer 4 connects the third of the pins 2, counted from the top in FIG. 2, to which the first signal line 7 of the first data bus 5 is connected, to the first of the pins 3, counted from the top in FIG. 2, to which the first signal line 10 of the second data bus 6 is connected; and the fourth of the pins 2, counted from the top in FIG. 2, to which the second signal line 8 of the first data bus 5 is connected, to the second of the pins 3, counted from the top in FIG. 2, to which the second signal line 11 of the second data bus 6 is connected; and the lowest of the pins 2 in FIG. 2, to which the third signal line 9 of the first data bus 5 is connected, to the third of the pins 3, counted from the top in FIG. 2, to which the third signal line 12 of the second data bus 6 is connected.

Instead of connecting the signal lines 10, 11, and 12 of the second data bus 6 respectively to the top three of the pins 3 in FIG. 2, the same could, for example, also be connected to the bottom three of the pins 3 in FIG. 2, for example, the first signal line 10 to the third-lowest of the pins 3, the second signal line 11 to the second-lowest of the pins 3, and the signal line 12 to the lowest of the pins 3. In this case, for coupling the first data bus 5 to the second data bus 6, the multiplexer 4 would connect the third-lowest of the pins 2 to the third-lowest of the pins 3, and would couple the second-lowest of the pins 2 to the second-lowest of the pins 3, and the lowest of the pins 2 to the lowest of the pins 3.

Since the multiplexer 4 can connect each of the first pins 2 to each of the second pins 3, it is possible to connect the signal lines 7, 8, and 9 of the first data bus 5 and the signal lines 10, 11, and 12 of the second data bus 6 to any of the pins 2 or 3. Depending on which of the pins 2 or 3 the signal lines 7 to 12 are connected to in a specific case, the connections between the pins 2 or 3 which are necessary for coupling the data buses 5 and 6 may be established via the multiplexer 4. In this case, in general, neither the number of signal lines of the data buses which are coupled to one another have to match, nor do the data buses have to belong to the same bus system or be of the same type. Furthermore, via the interface module 1, it is possible to connect signal lines of a data bus to signal lines which belong to different data buses. For example, two signal lines of the same data bus which are connected to respective pins 3 may be connected via the multiplexer 4 to signal lines which are connected to respective pins 2, even if the signal lines connected to the respective pins 2 belong to respectively different data buses. As a result, there is a high overall degree of flexibility of the interface module 1.

Figure 3A:
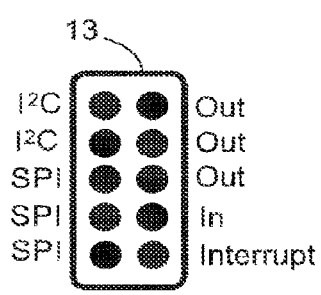
FIG. 3a) shows a connector profile of an interface module in a first specific configuration.

In this connection, FIG. 3a) depicts a connector profile of an interface module 13 having a total of ten signal line ports, which are arranged in two rows which are perpendicular and parallel to one another, to form five freely configurable signal line ports in each case. In FIG. 3a), the interface module 13 is configured by correspondingly connecting the signal line ports in such a way that different functions are available at the signal line ports of the depicted connector profile. Thus, the top two signal line ports in the left row provide the function of a serial data bus which is identified as $I^2C$, which is used primarily within the device for communication between different circuit parts, for example, a control unit and peripheral circuits. On the other hand, the subjacent three signal line ports are associated with a so-called serial peripheral interface or SPI, which is a synchronous serial data bus having three lines, via which digital circuits may be interconnected according to the master-slave principle. The top three signal line ports of the right side are respectively signal outputs, while the subjacent signal line port is a signal input. Finally, the bottom signal line port of the right row is provided for a so-called interruption request or an interrupt.

Figure 3B:
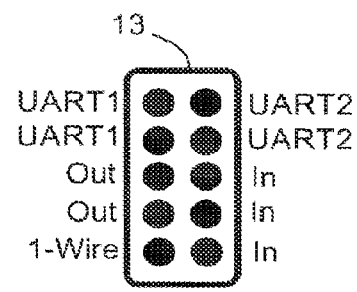
FIG. 3b) shows the connector profile of FIG. 3a) in a second specific configuration.

FIG. 3b) shows the same interface module 13 following a reconfiguration of the signal line ports. The top two signal line ports of the left row are now provided for a first UART (universal asynchronous receiver-transmitter) interface, which is used for transmitting and receiving data via a data line. Two signal line ports are provided thereunder as a signal output. On the other hand, the bottom signal line port of the left row is configured as a one-wire bus, i.e., as a serial interface. The top two signal line ports of the right row are also provided for a UART interface, more precisely, for a second UART interface, while the three subjacent signal line ports are provided as signal inputs.

Figure 4:
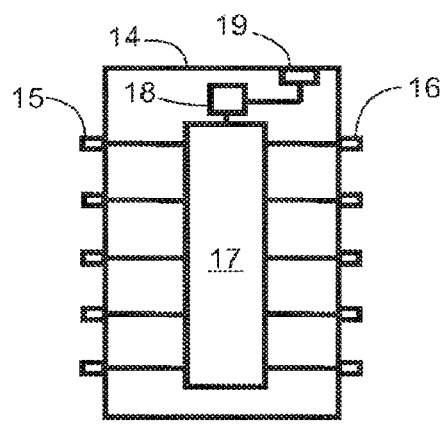
FIG. 4 shows an interface module including a control unit and an interface for data transmission.

The interface module 14 shown in FIG. 4 is particularly advantageous; in addition to pins 15 of a first connector profile and pins 16 of a second connector profile, as well as a multiplexer 17, said interface module 14 furthermore comprises a control unit 18 connected to the multiplexer 17 and an interface 19 for data transmission. In the case of the interface module 14, the paired connection of respective pins 15 and 16, and thus the configuration of the respective connector profiles, is controlled via control commands output by the control unit 18, wherein the control unit 18 may in turn be programmed or controlled from an external position via the interface 19, or may receive relevant data via said interface for establishing the connections or configuring the connector profiles.

Figure 5:
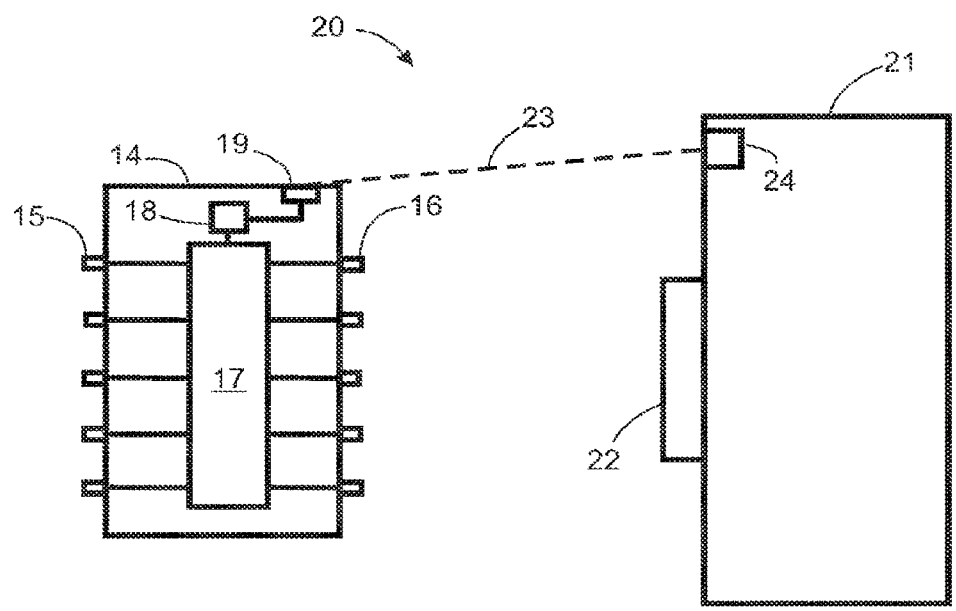
FIG. 5 shows a system comprising the interface module of FIG. 4 and a device.

The interface module 14 is shown in FIG. 5 as part of a system 20 to which a device 21 belongs, in addition to the interface module 14. The device 21 comprises a data bus 22 with signal lines which are connectable to the pins 16 of the interface module 14. Said device is presently configured to establish a data transmission connection 23, shown by dashed lines in FIG. 5, to the interface module 14 or its interface 19. Thus, the control unit 18 may receive or read out data stored on the device 21 about the required configuration of the pins 16 for connecting the signal lines of the data bus 22 to the pins 16, via the transmission connection 23 and the interface 19. These data may, for example, be stored in a data memory 24 of the device 21, or in an RFID transponder. In the latter case, the interface module 14 has a reading means for reading the RFID transponder. According to the data received by the device 21, the multiplexer 17 is now controlled by the control unit 18 in such a way that corresponding connections between pairs of pins 15 and 16 are established, so that the totality of the pins 16 or the connector profile 5 formed by them comprises the configuration required by the signal lines of the data bus 22. The system 20 formed from the interface module 14 and the device 21 is thus capable of carrying out necessary configurations of the pins 15 and 16 essentially automatically.

In general, in the following claims, the terms used should not be construed to limit the claims to the specific embodiments disclosed in the specification and the claims, but should be construed to include all possible embodiments along with the full scope of equivalents to which such claims are entitled.

The invention claimed is:

1. A system, comprising:
 a robot arm or other piece of industrial machinery having a machine data bus;
 a plurality of industrial machine tools separate and distinct from and interchangeably usable with the robot arm or other piece of industrial machinery, the plurality of industrial machine tools including a first industrial machine tool with a first machine tool data bus and a second industrial machine tool with a second machine tool data bus which is different than the first machine tool data bus; and
 an interface module for alternatively coupling the machine data bus of the robot arm or other piece of industrial machinery to one of the first and second machine tool data buses, the interface module including a plurality of first signal line ports to which signal lines of the machine data bus of the robot arm or other piece of industrial machinery are connectable, and including a plurality of second signal line ports to which signal lines of the first and second tool data buses of the first and second machine tools are interchangeably connectable,
 the interface module comprising at least one connecting device configured to establish at least one connection between a first signal line port of the plurality of the first signal line ports and a second signal line port of the plurality of second signal line ports for coupling the machine data bus of the robot arm or other piece of industrial equipment to the first machine tool data bus of the first industrial machine tool, and
 wherein the first signal line port connected to the second signal line port is alternately connectable via the at least one connecting device to at least one other second signal line for coupling the machine data bus of the robot arm or other piece of industrial machinery to the second tool data bus of the second industrial machine tool to enable the first and second industrial machine tools to be used interchangeably with the robot arm or other piece of industrial machinery over time during use of the robot arm or other piece of industrial machinery in an industrial facility.

2. The system as claimed in claim 1, in which the alternating connection of first signal line ports and second signal line ports is automatically controllable.

3. The system as claimed in claim 1, wherein the interface module is configured to receive data relating to the alternating connection of first signal line ports and second signal line ports from an external data source.

4. The system as claimed in claim 1, further comprising at least one control unit and/or at least one reading device for reading RFID transponders and/or at least one interface for data transmission.

5. The system as claimed in claim 1, in which the robot arm or other piece of industrial machinery, the first industrial machine tool and/or the second industrial machine tool is configured to transmit data to the interface module relating to the alternating connection of first signal line ports and second signal line ports.

6. The system as claimed in claim 1, in which the robot arm or other piece of industrial machinery, the first industrial machine tool and/or the second industrial machine tool comprises at least one data memory or RFID transponder for storing data, which is configured for establishing a data transmission connection between the interface module and the robot arm or other piece of industrial machinery, the first industrial machine tool and/or the second industrial machine tool.

7. A method for coupling data buses via an interface module to facilitate the interchangeable use of one of a plurality of industrial machine tools with a robotic arm or other piece of industrial machinery, the method comprising:
 connecting signal lines of at least a machine data bus of the robot arm or other piece of industrial machinery to first signal line ports of the interface module;
 connecting signal lines of a second first machine tool data bus of a first one of the plurality of industrial machine tools to second signal line ports of the interface module;
 establishing at least one connection between one of the first signal line ports and one of the second signal line ports to operatively transmit data or signals between the machine data bus of the robot arm or other piece of industrial machinery and the first machine tool data bus of the first one of the plurality of industrial machine tools;

thereafter, disconnecting the signal lines of the first machine tool data bus of the first one of the plurality of industrial machine tools from the second signal line ports of the interface module;

connecting signal lines of a second machine tool data bus of a second one of the plurality of industrial machine tools which is different from the first machine tool data bus of the first one of the plurality of industrial machine tools to the second signal line ports of the interface module; and changing the connection to operatively transmit data or signals between the machine data bus of the robot arm or other piece of industrial machinery and the second machine tool data bus of the second one of the plurality of industrial machine tools, in that the first signal line port connected to the second signal line port is connected to another second signal line port to which a signal line of the second machine tool data bus is connected, to thereby provide for interchangeable use of the first and second industrial machine tools with the robot arm or other piece of industrial machinery over time during use of the robot arm or other piece of industrial machinery in an industrial facility.

8. The method as claimed in claim 7, in which the changing of the connection takes place automatically.

9. The method as claimed in claim 7, in which the interface module receives data, which relate to the changing of the connection, from an external data source.

10. The method as claimed in claim 9, in which the interface module at least partially reads out the data from at least one data memory or RFID transponder of a device comprising at least the machine data bus, at least the first machine tool data bus and/or at least the second machine tool data base, and/or at least partially receives said data via at least one interface for data transmission.

\* \* \* \* \*

UNITED STATES PATENT AND TRADEMARK OFFICE
CERTIFICATE OF CORRECTION

| | | |
|---|---|---|
| PATENT NO. | : 11,392,524 B2 | Page 1 of 1 |
| APPLICATION NO. | : 16/305375 | |
| DATED | : July 19, 2022 | |
| INVENTOR(S) | : Markus Friesen et al. | |

It is certified that error appears in the above-identified patent and that said Letters Patent is hereby corrected as shown below:

On the Title Page

Item (73) - Assignee:
"Harting Electric GmbH & Co. KG, Espelkamp, WA (US)"
Should read:
--Harting Electric GmbH & Co. KG, Espelkamp (DE)--.

In the Claims

Column 8, Claim 7, Line 62:
"lines of a second first machine tool"
Should read:
--lines of a first machine tool--.

Signed and Sealed this
Thirtieth Day of December, 2025

John A. Squires
*Director of the United States Patent and Trademark Office*